(12) United States Patent
Gronau et al.

(10) Patent No.: US 7,948,232 B2  
(45) Date of Patent: May 24, 2011

(54) POSITION MEASURING APPARATUS

(75) Inventors: Jens-Thorsten Gronau, Hameln (DE); Mike Heurich, Apelern (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 153 days.

(21) Appl. No.: 12/386,258

(22) Filed: Apr. 14, 2009

(65) Prior Publication Data
US 2009/0261818 A1    Oct. 22, 2009

(30) Foreign Application Priority Data
Apr. 18, 2008    (DE) .......................... 10 2008 019 541

(51) Int. Cl.
*G01B 7/30*    (2006.01)

(52) U.S. Cl. .................................. 324/207.25; 324/174
(58) Field of Classification Search .......... 324/173–174, 324/207.24–207.26; 73/514.31, 514.39
See application file for complete search history.

(56) References Cited

U.S. PATENT DOCUMENTS

| | | | | |
|---|---|---|---|---|
| 4,438,496 A | * | 3/1984 | Ohie | ............................ 701/104 |
| 2004/0211928 A1 | * | 10/2004 | Coura et al. | ............ 251/129.04 |

\* cited by examiner

*Primary Examiner* — Bot L LeDynh  
(74) *Attorney, Agent, or Firm* — Kramer Levin Naftalis & Frankel LLP

(57) ABSTRACT

A position measuring apparatus includes at least one bearing, a rod of magnetizable material guided in the at least one bearing, a linear magnetic field sensor, and a magnet disposed next to the linear magnetic field sensor. The rod includes a cutout, and the magnet is arranged in the cutout within an enveloping cylinder lateral surface around the rod.

10 Claims, 3 Drawing Sheets

POSITION MEASURING APPARATUS

FIELD OF THE INVENTION

The present invention relates generally to a position measuring apparatus of the type having: (a) a bearing, (b) a rod, formed from a magnetizable material, guided in the bearing, (c) a linear magnetic field sensor, and (d) a magnet disposed next to the linear magnetic field sensor.

BACKGROUND OF THE INVENTION

Position measuring apparatuses are used, for example, in pneumatic or hydraulic cylinders that are arranged in transmission actuators. The transmission actuator carries out the shifting movement in a vehicle's automatic transmission. The transmission actuator includes a position measuring apparatus so that the electronic controller of the transmission, in which the transmission actuator is included, can always acquire the position of the pneumatic or hydraulic piston.

For reasons of stability, the rod employed in the position measuring apparatus is typically formed from steel. A magnet, the position of which is detected by the linear magnetic field sensor, is conventionally disposed on the rod.

In order to avoid the distortion of the magnetic field lines of the magnet by the steel rod, the magnet is fastened on the rod by means of a non-magnetizable receptacle and protrudes above the rod. However, the rod with the mounted receptacle, which lies outside the diameter of the rod, cannot be fed through the bearing. Thus, the production of conventional position measuring apparatuses is complicated and, hence, disadvantageous.

SUMMARY OF THE INVENTION

Generally speaking, in accordance with embodiments of the present invention, an improved position measuring apparatus is provided which overcomes disadvantages associated with conventional position measuring apparatuses.

The position measuring apparatus according to the present invention includes the known features of: (a) the bearing, (b) the rod guided in the bearing, (c) the linear magnetic field sensor, and (d) the magnet. However, in accordance with embodiments of the present invention, the rod includes a cutout, and the magnet is arranged in the cutout inside an enveloping surface, in the shape of a cylinder lateral surface, around the rod. That is, the magnet is positioned inside the diameter of the rod—arranged in the cutout such that it does not protrude radially beyond the rod.

An enveloping surface in the shape of a cylinder lateral surface is an imaginary surface in the shape of a lateral cylinder surface whose points all lie outside the rod, and for which there is no imaginary cylinder lateral surface that has a larger diameter. Thus, references herein to such enveloping surface are in the mathematical sense.

Advantageously, the position measuring apparatus according to embodiments of the present invention is easy to mount. Thus, the rod with the magnet mounted in the cutout can be inserted into the bearing and fastened there. In addition, a smaller construction space results as compared to conventional position measuring apparatuses.

It is a further advantage of the position measuring apparatus according to embodiments of the present invention that the arrangement of the magnet in the bearing diameter does not interfere with the function of the linear magnetic field sensor.

Magnetizable material, e.g., ferromagnetic material, located in the environment of a magnet distorts the magnetic field lines emanating from the magnet. It would, therefore, be expected that arranging the magnet in the cutout in the rod would result in the magnetic field lines being influenced by the rod, corrupting the position measuring results of the position measuring apparatus. For this reason, the magnet has conventionally been arranged outside the cylinder lateral enveloping surface. However, the rod's influence which varies the magnetic field lines can be diminished until it is possible to measure position exactly despite the negative influence of the rod. In other words, the position measuring apparatus according to embodiments of the present invention overcomes conventional prejudice that the magnet must be arranged as far as possible radially outside the rod.

In accordance with embodiments of the present invention, the linear magnetic field sensor is arranged such that the position of the rod can be acquired and can be read out by an electronic unit.

Also, in accordance with embodiments of the present invention, the bearing is formed on a sleeve that can have an open end and a closed end situated opposite the open end. That is, the rod is guided at least partially in the sleeve, it thereby being possible, but not necessary, for the rod to be in contact with the sleeve over its entire longitudinal extent.

According to an embodiment of the present invention, the cutout is arranged at an axial edge of the rod and merges into the edge. In this case, the cutout can also be characterized as a recess positioned at the edge. In accordance with an alternative embodiment, the cutout is spaced from the edge.

It is possible, but not necessary, for the rod to have a cylindrical basic shape.

According to an embodiment of the present invention, the rod extends in a longitudinal direction. The cutout has a base surface that has a base surface length in the rod longitudinal direction, and the magnet has a magnet length in the rod longitudinal direction that is smaller than 0.6 times, preferably, less than half, the base surface length. Distortion of the magnetic field lines by the rod is thereby minimized.

Additionally, the cutout is preferably delimited at one end with reference to the rod longitudinal direction by a first cutout wall, the magnet being spaced from the first cutout wall by at least the magnet length. This enables a particularly slight deformation of the magnetic field lines of the magnet by the rod.

The perturbation of the magnetic field lines by the rod becomes particularly slight when the first cutout wall encloses with the rod longitudinal direction a first angle of less than 45°.

Furthermore, the cutout is preferably delimited at a second end, situated opposite the first end, by a second cutout wall, and the magnet is spaced from the second cutout wall by at least the magnet length. The second cutout wall preferably encloses with the rod longitudinal direction an angle of less than 45°.

It is possible, but not necessary for the first cutout wall and the second cutout wall to be inclined at the same angle relative to the rod longitudinal direction.

Accordingly, it is an object of the present invention to provide an improved position measuring apparatus that is easy to produce and mount and, at the same time, is accurate.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

In accordance with embodiments of the present invention, an improved position measuring apparatus is provided which includes: (a) a bearing, (b) a rod guided in the bearing, (c) a linear magnetic field sensor, and (d) a magnet. As discussed in greater detail hereinafter, the rod includes a cutout, and the magnet is arranged in the cutout inside an enveloping cylinder lateral surface around the rod.

Figure 1:
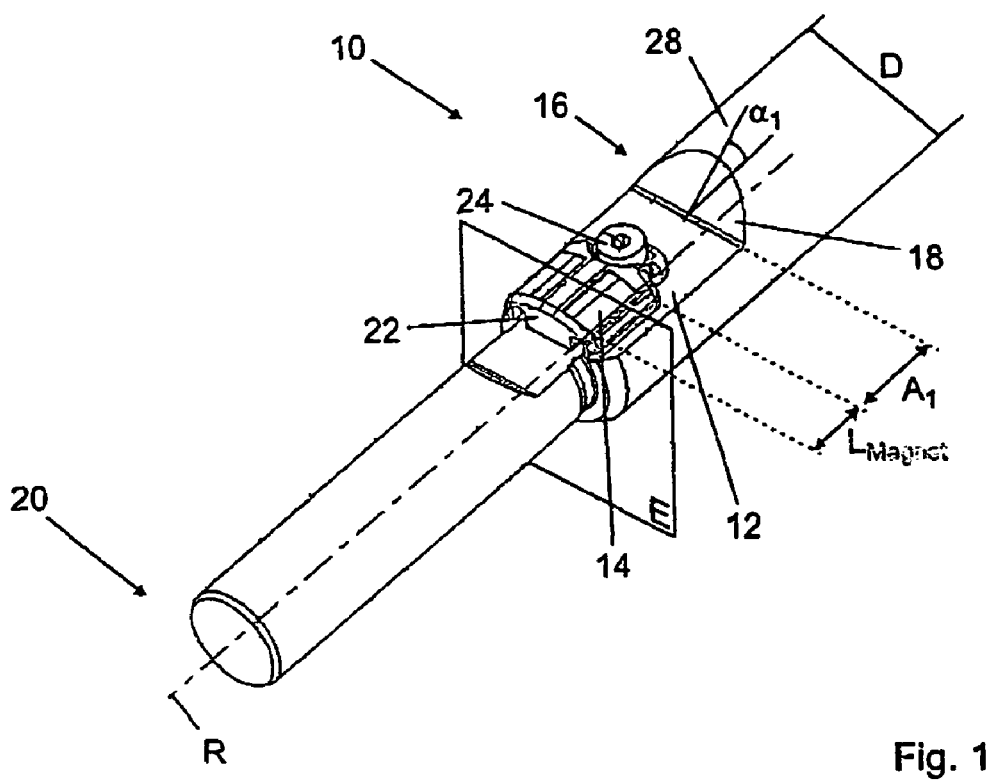
FIG. 1 is a perspective view of a rod of a position measuring apparatus according to an embodiment of the present invention.

Referring now to the drawing figures, FIG. 1 shows rod 10 formed from a magnetic material (e.g., steel) having an outside diameter D. Magnet 14 is arranged in cutout 12. The magnet 14 desirably has a field strength of more than 1 tesla—in the present case, for example, the field strength is 1.2 teslas.

At a first end 16, cutout 12 is delimited by a first cutout wall 18 that constitutes the transition from cutout 12 into rod 10. First cutout wall 18 is inclined relative to a rod longitudinal direction R, and encloses with the latter a first angle $\alpha_1$, which, in the present case, for example, is 45°. Rod 10 has a cylindrical basic shape. Magnet 14 is fastened in a receptacle 22, and, together with receptacle 22, is fastened on rod 10, for example, via a screw 24.

Magnet 14 has a magnet length $L_{Magnet}$ of, for example, less than 20 mm (in the present case, 10 mm). In rod longitudinal direction R, magnet 14 is spaced from the base of first cutout wall 18 a distance $A_1$ that is greater than magnet length $L_{Magnet}$ and, in the present case, for example, is 20 mm.

Figure 2:
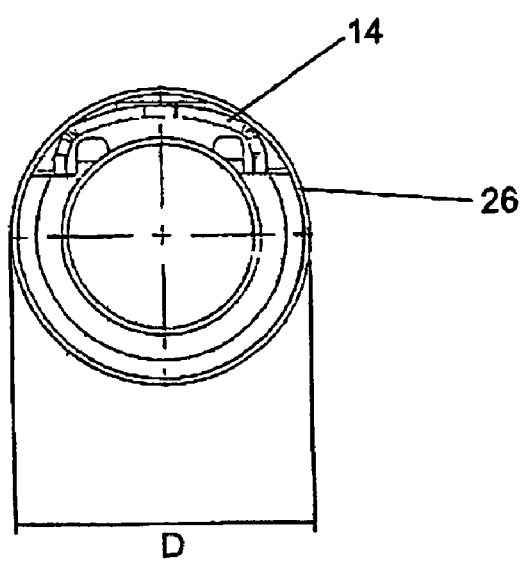
FIG. 2 is a cross-sectional view taken along plane E of FIG. 1.

FIG. 2 shows a cross-section perpendicular to rod longitudinal direction R through rod 10. Magnet 14 and receptacle 22 lie inside an enveloping surface 26 that is in the shape of a cylinder lateral surface and that has outside diameter D. Enveloping surface 26 results from reducing the diameter of an imaginary surface in the shape of a cylinder lateral surface, which includes the components of rod 10 that are shown in FIG. 1, until the minimum possible diameter is reached. Since, in the present case, rod 10 has a cylindrical basic body 28 with an outside diameter D beyond the first cutout wall 18 (FIG. 1), enveloping surface 26 is identical to the outer contour of the basic body 28.

Figure 3:
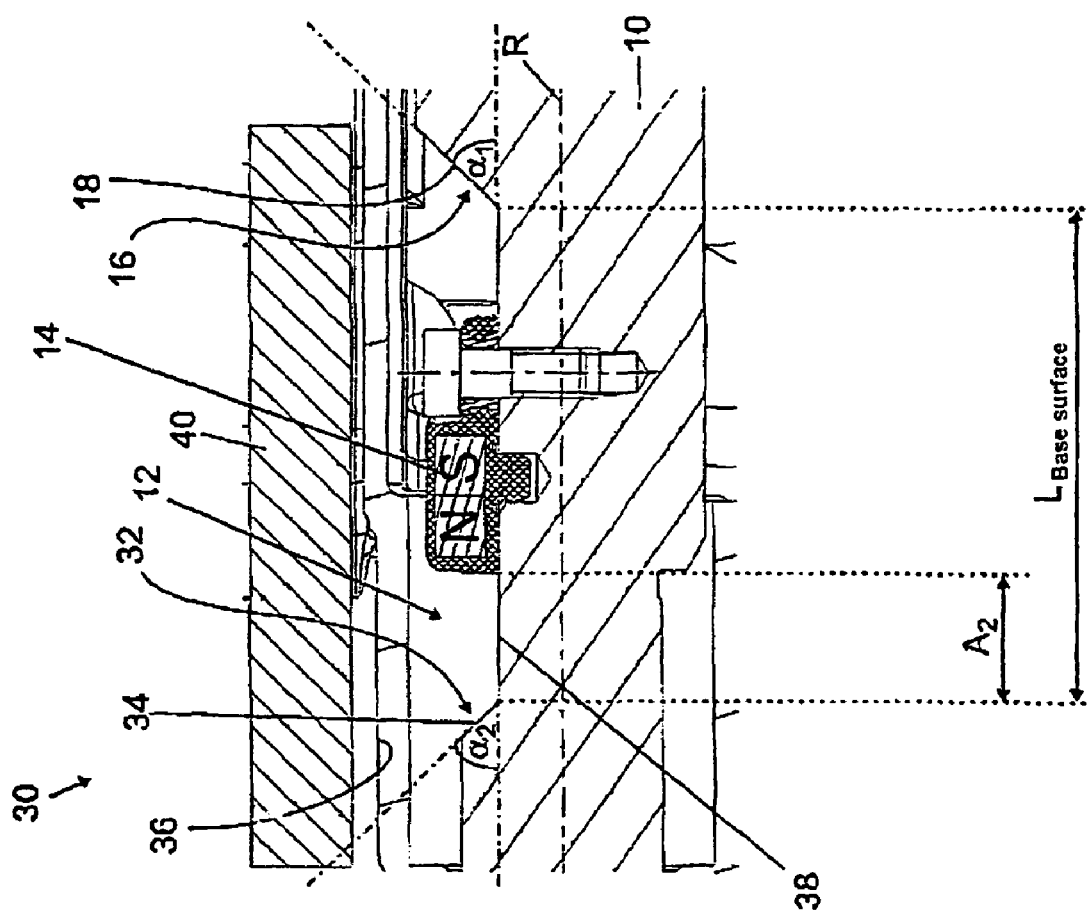
FIG. 3 is a longitudinal sectional view through a position measuring apparatus according to another embodiment of the present invention.

FIG. 3 shows a cross-section through a position measuring apparatus 30 in accordance with another embodiment of the present invention. Rod 10 is delimited at a second end 32, situated opposite first end 16, by a second cutout wall 34 that encloses a second angle $\alpha_2$, of, for example, 45°, with rod longitudinal direction R. Rod 10 runs in a bearing 35 that includes component bearings 35.1 and 35.2 which are formed on a sleeve 36.

Between first cutout wall 18 and second cutout wall 34, cutout 12 has a base surface 38 that has a base surface length $L_{Base\ surface}$. Base surface length $L_{Base\ surface}$ is a multiple of magnet length $L_{Magnet}$ (compare FIG. 1). A second spacing $A_2$ between magnet 14 and second cutout wall 34 is greater than magnet length $L_{Magnet}$.

Linear magnetic field sensor 40 is arranged on sleeve 36 next to magnet 14. Linear magnetic field sensor 40 can be a PLCD (permanent magnetic linear contactless displacement) sensor. The position of rod 10 relative to linear magnetic field sensor 40 can be measured with high accuracy with the aid of position measuring apparatus 30 when first spacing $A_1$ and second spacing $A_2$ are selected as described above. In order to produce the position measuring apparatus, magnet 14 is first fastened in its receptacle 22 on rod 10. Rod 10 is subsequently inserted into sleeve 36 such that it is supported by component bearings 35.1, 35.2.

Figure 4:
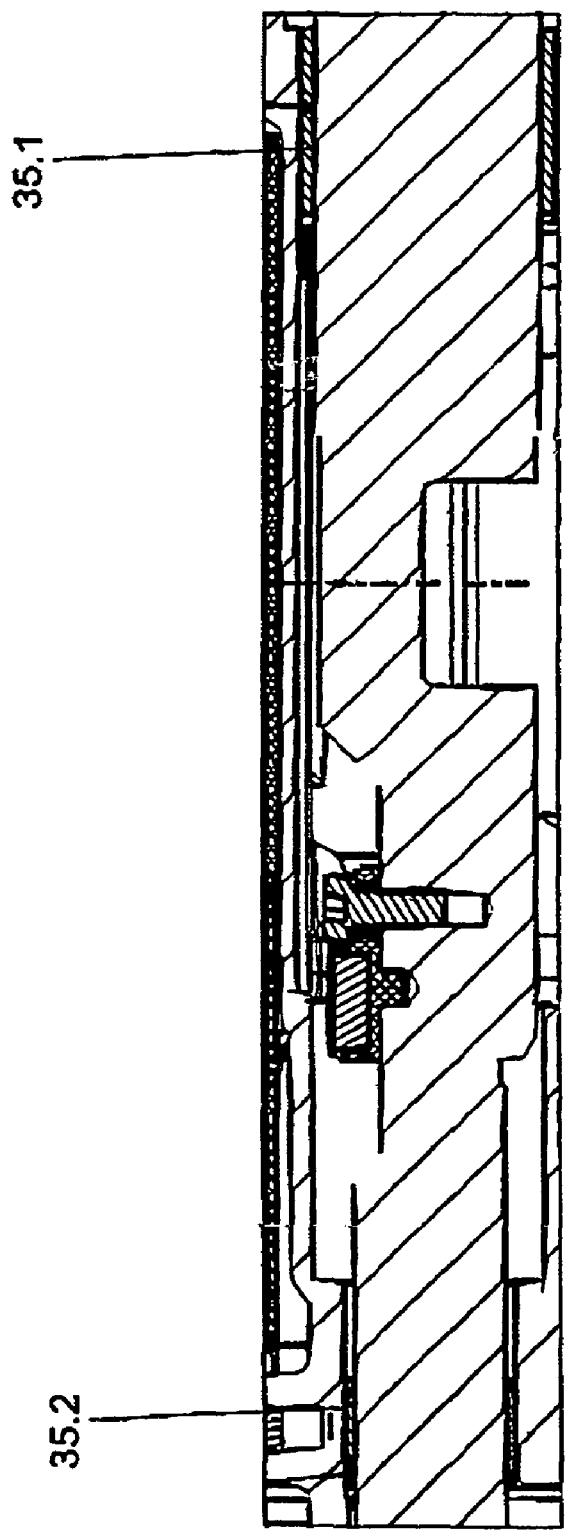
FIG. 4 is a view that corresponds to that of FIG. 3 showing component bearings.

FIG. 4 is a view that corresponds to that of FIG. 3 showing component bearings 35.1, 35.2. It is advantageous to arrange magnet 14 and cutout 12 between component bearings 35.1, 35.2.

Accordingly, the present invention provides an improved position measuring apparatus that is easy to produce and mount, and that is capable of accurate measurement.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A position measuring apparatus, comprising:
   at least one bearing;
   a rod of magnetizable material guided in said bearing, a portion of said rod including a cutout, said rod including an enveloping cylinder lateral surface;
   a linear magnetic field sensor; and
   a magnet disposed proximate said linear magnetic field sensor in said cutout and under said enveloping cylinder lateral surface, such that said magnet is disposed inside said rod.

2. The position measuring apparatus according to claim 1, wherein said cutout is defined at and merges into an axial edge of said rod.

3. A position measuring apparatus comprising:
   at least one bearing;
   a rod of magnetizable material guided in said bearing, a portion of said rod including a cutout, said rod extending in a longitudinal direction and said cutout including a base surface having a base surface length in said longitudinal direction;
   a linear magnetic field sensor; and
   a magnet disposed proximate said linear magnetic field sensor in said cutout and within an enveloping cylinder lateral surface about said rod, said magnet having a magnet length in said longitudinal direction, said magnet length being smaller than about 0.6 times said base surface length.

4. The position measuring apparatus according to claim 3, wherein said magnet length is smaller than about one half of said base surface length.

5. A position measuring apparatus comprising:
at least one bearing;
a rod of magnetizable material guided in said bearing, a portion of said rod including a cutout;
a linear magnetic field sensor; and
a magnet disposed proximate said linear magnetic field sensor in said cutout within an enveloping cylinder lateral surface about said rod, said cutout being delimited by a first cutout wall, and said magnet being spaced from said first cutout wall by at least a magnet length of said magnet.

6. The position measuring apparatus according to claim 5, wherein said first cutout wall defines a first angle of less than about 45° relative to a longitudinal axis of said rod.

7. The position measuring apparatus according to claim 5, wherein said cutout is delimited by a second cutout wall opposite said first cutout wall, and said magnet is spaced from said second cutout wall by at least said magnet length.

8. The position measuring apparatus according to claim 7, wherein said second cutout wall defines a second angle of less than about 45° relative to a longitudinal axis of said rod.

9. The position measuring apparatus according to claim 1, further comprising a sleeve having an open end and a closed end opposite said open end, said at least one bearing being formed on said sleeve.

10. A transmission actuator, comprising a position measuring apparatus as claimed in claim 1.

\* \* \* \* \*